United States Patent [19]
Chase

[11] Patent Number: 4,978,063
[45] Date of Patent: Dec. 18, 1990

[54] AUTOMATIC CONTROL DEVICE FOR INDIRECT FIRED WATER HEATERS AND HEAT EXCHANGERS

[76] Inventor: Kent B. Chase, 2319 Marlborough Rd., Colorado Springs, Colo. 80909

[21] Appl. No.: 472,791

[22] Filed: Jan. 31, 1990

[51] Int. Cl.⁵ ............................................. F24D 3/00
[52] U.S. Cl. ...................................... 237/8 R; 237/19
[58] Field of Search ................... 237/8 R, 19; 236/9 A

[56] References Cited

U.S. PATENT DOCUMENTS

| | | | |
|---|---|---|---|
| 3,504,848 | 4/1970 | Foster | 236/1 |
| 4,192,455 | 3/1980 | Rasmussen et al. | 237/8 R |
| 4,337,891 | 7/1982 | Overman | 236/9 A |
| 4,355,760 | 10/1982 | Ruby | 236/47 |
| 4,364,512 | 12/1982 | Morrison | 236/9 |
| 4,470,541 | 9/1984 | Raleigh | 236/21 |
| 4,508,261 | 4/1985 | Blank | 236/20 R |
| 4,599,992 | 7/1986 | Harding | 126/351 |
| 4,638,787 | 1/1987 | George | 122/448 B |
| 4,671,459 | 6/1987 | Stapensea | 237/19 X |
| 4,844,335 | 7/1989 | McKinley et al. | 237/8 R |
| 4,850,310 | 7/1989 | Wildgen | 122/446 |

Primary Examiner—Henry A. Bennet
Attorney, Agent, or Firm—Shlesinger & Myers

[57] ABSTRACT

An automatic control device for a hot water heating system, comprises a first relay being connectable to a water temperature switch such that the first relay is energized when the switch is closed and a second relay connected to the first relay such that the second relay is energized when the first relay is energized. The first relay is connectable to an electrically operated valve controlling the flow of high temperature water from a boiler to a heat exchanger operably associated with a water heater such that the electrically operated valve is opened when the first relay is energized and closed when the first relay is de-energized. The first relay is connectable to the boiler such that the boiler is turned on when the first relay is energized. The second relay is connectable to a plurality of zone valves controlling the flow of high temperature water from the boiler to a plurality of space heaters such that the plurality of zone valves are turned off when the second relay is energized, thereby diverting a substantial portion of the output of the boiler to the water heater when the water temperature switch is closed.

18 Claims, 7 Drawing Sheets

FIG_1

AUTOMATIC CONTROL DEVICE FOR INDIRECT FIRED WATER HEATERS AND HEAT EXCHANGERS

FIELD OF THE INVENTION

The present invention relates generally to an automatic control device for indirect fired water heaters and heat exchangers and the like in a hydronic heating system.

BACKGROUND OF THE INVENTION

An indirect fired water heater, such as the one disclosed in U.S. Pat. No. 4,313,400, for use in generating hot water for use in kitchens, bathrooms, laundries and the like in a building, typically includes a heat exchanger within a water tank and is in direct contact with the water therein. High temperature water is generated in a boiler and circulated through the water heater heat exchanger to raise the water temperature in the tank, thereby producing hot water. In addition to the water heater load, the boiler typically supplies other loads in the building, such as space heating load. When hot water in the water heater is drawn down and replaced by cold make-up water, a thermostat in the water heater demands high temperature water from the boiler. Since the output of the boiler is shared with other heating loads, the amount of high temperature water available to the water heater is relatively less. Thus, the recovery rate or the time required to heat up the water to the temperature set by the thermostat will be longer than when the boiler is dedicated to the water heater. Consequently, inconvenience due to lack of adequate amount of hot water may be experienced.

To alleviate this problem, a control device is needed that will shut off the other loads of the boiler when the water heater is calling for heat during a drawdown so that at least a substantial portion of the boiler output is directed to the water heater to provide it with a relatively faster recovery rate.

OBJECTS AND SUMMARY OF THE INVENTION

It is therefore an object of the present invention to provide an automatic control device for an indirect fired water heater in a hydronic heating system that directs at least a substantial portion of the output of a boiler to the water heater when it calls for heat during a drawdown.

It is another object of the present invention to provide an automatic control device for an indirect fired water heater in a hydronic heating system that shuts down other loads of a boiler so that at least a substantial portion of its output is directed to the water heater when it calls for heat during a drawdown.

It is still another object of the present invention to provide an automatic control device for indirect fired water heater in a hydronic heating system that turns on the boiler when the water heater calls for heat during a drawdown.

It is yet another object of the present invention to provide an automatic control device for an indirect fired water heater in a hydronic heating system that eliminates the need to connect to the boiler internal control circuitry for controlling the boiler operation.

It is still further another object of the present invention to provide an automatic control device for an indirect fired water heater in a hydronic heating system that permits connection to the boiler external thermostat terminals for controlling the boiler operation.

It is an object of the present invention to provide an automatic control device for an indirect fired water heater in a hydronic heating system that permits the water heater to use the boiler circulation pump, thereby eliminating the need for installing another circulation pump.

It is another object of the present invention to provide an automatic control device for an indirect fired water heater in a hydronic heating system that is relatively maintenance free.

It is still another object of the present invention to provide an automatic control device for an indirect fired water heater in a hydronic heating system that improves the recovery rate of the water heater or heat exchanger.

It is yet another object of the present invention to provide an automatic control device for an indirect fired water heater in a hydronic heating system that is relatively safe and easy to install.

It is still further another object of the present invention to provide an automatic control device for an indirect fired water heater in a hydronic heating system that is transparent to the existing controls in the heating system.

It is another object of the present invention to provide an automatic control device for an indirect fired water heater in a hydronic heating system that will not affect the space heating function of the system in case of failure in the control device.

In summary, the present invention provides an automatic control device for an indirect fired water heater that improves its performance.

These and other objects of the present invention will become apparent from the following detailed description.

BRIEF DESCRIPTIONS OF THE DRAWINGS

DETAILED DESCRIPTION OF THE INVENTION

FIG. 1

Figure 1:
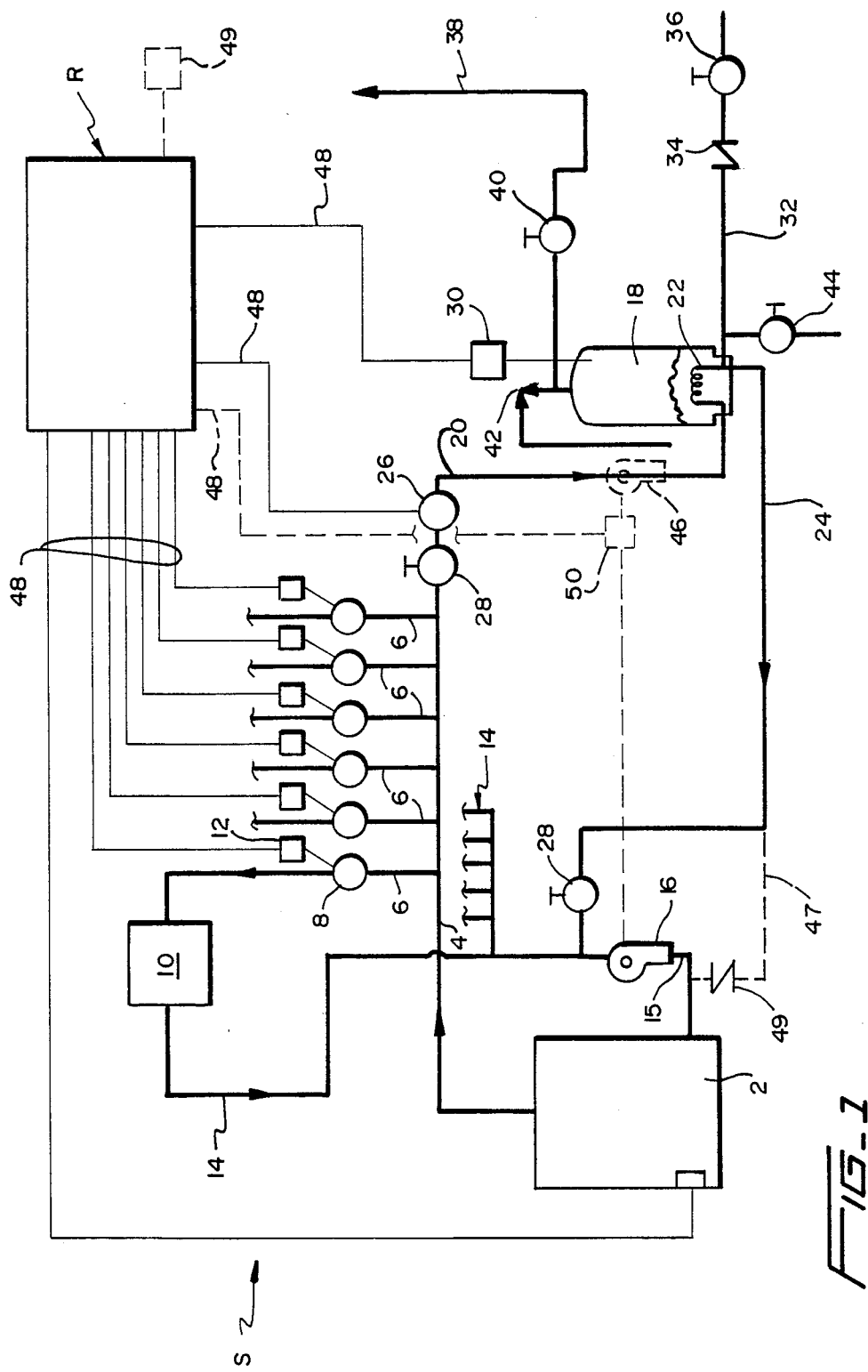
FIG. 1 is a schematic diagram of a hydronic heating system, with portions shown broken away and in dashed lines, using a control device according to the present invention.

A control device R in accordance with the present invention is disclosed in FIG. 1 as being connected to a hydronic heating system S. The hydronic heating system S is a typical residential installation. A boiler 2 generates high temperature water for space heating and hot water for use in kitchens, bathrooms, laundries, etc. A main supply line 4 supplies high temperature water to a plurality of branch lines 6. An electrically operated zone valve 8 is disposed in each branch line 6 and regulates the flow of high temperature water to one or more radiators 10 connected downstream of each valve 8. The radiators 10 (only one shown for clarity) provides space heating means within a portion or zone of the house and are controlled by the respective zone valves 8 which are electrically operated valves, such as solenoid valves or motor operated valves. A thermostat 12 is operably connected to each zone valve 8. Each thermostat 12 senses the zone or room temperature and causes the opening or closing of the respective zone valve 8, depending on the temperature setting of the thermostat 12, to thereby regulate the room temperature.

A return line 14 connects each radiator 10 to the boiler 2 through a main return line 15. A closed system is thereby provided where boiler water is repeatedly heated up in the boiler 2 and heat is repeatedly given up in each radiator 10. A circulator pump 16 disposed in the main return line 15 moves the boiler water through the system.

A water heater 18 is operably connected to the boiler 2 through a branch line 20 connected to the supply line 4. The branch line 20 is connected to a heat exchanger 22 disposed within the water heater 18 and heats the water within the water heater 18 to a set temperature. A return line 24 connected to the heat exchanger 22 pipes the boiler water back to the boiler 2. An electrically operated valve 26, preferably a solenoid valve, is disposed in the branch line 20 and controls the flow of high temperature water to the heat exchanger 22. Other types of electrically operated valves, such as a motor-operated valve, may be used. Gate valves 28 are typically used to isolate the water heater 18 from the rest of the system for routine maintenance, repair, replacement, etc.

A thermostat 30 provides upper and lower temperature limits in the water heater 18. Heat is admitted to the water heater 18 through the heat exchanger 22 when the thermostat lower limit is reached. Likewise, the heat exchanger 22 is shut off when the thermostat upper limit is reached. The open or closed position of the valve 26 determines whether the heat exchanger 22 is providing heat to the water heater 18. The return line circulator pump 16 is used by the water heater 18 to draw the boiler water through the heat exchanger 22.

A cold water line 32 maintains the water level within the water heater 18. A check valve 34 and a gate valve 36 disposed in the cold water line 32 are typically required by building codes. A supply line 38 distributes the hot water to locations within the house where it is needed, such as the kitchen, bathroom, etc. A gate valve 40 disposed in the supply line 38 is typically used to turn off the hot water line for maintenance or other purposes. A safety release valve 42 connected to the water heater 18 provides emergency release of any built-up pressure above certain safety limits. A drain valve 44 connected to the water heater 18 allows for draining the water therein during maintenance, repair, etc.

In some systems, a circulator pump 46 (shown in dashed lines) disposed in the branch line 20 is used instead of the valve 26. In this instance, the water heater return line 24 is connected to the boiler 2 such that it bypasses the circulator pump 46, generally indicated at 47 in dashed lines in FIG. 1. Thus, the circulator pump 46, instead of the return line circulator pump 16, is used to circulate boiler water through the heat exchanger 22 when the thermostat 30 is calling for heat. A check valve 49 ensures that boiler water flows only in one direction, as generally indicated by the arrows.

The control device R uses 24 volt power. Wires 48 operably connect the device R to the boiler 2, thermostats 12, zone valves 8, valve 26, and thermostat 30. An outside temperature sensor 49 (shown in dashed lines) may also be connected to the device R. The device R is responsive to the temperature limits set by the thermostat 30. The device R is transparent to the system S until the temperature in the water heater 18 goes down to the lower thermostat limit when hot water is being used. At that point, the thermostat 30 triggers the control device R which takes over the system S so that at least a substantial portion of the output of the boiler 2 is provided to the water heater 18 through the heat exchanger 22. The device R closes the zone valves 8, opens the valve 26 and turns on the boiler 2. When the water heater temperature reaches the upper thermostat limit, the device R releases control of the system S, until the water heater temperature goes down again to the lower thermostat limit and the entire cycle is repeated.

In the situation where the valve 26 is replaced by the circulator pump 46, an auxiliary relay 50 is preferably used to control the circulator pump 46 and the return line circulator pump 16. In this case, the activation of the device R results in turning on the water heater circulator pump 46 and turning off the return line circulator pump 16, in addition to closing the valves 6 and turning on the boiler 2.

FIG. 2

Figure 2:
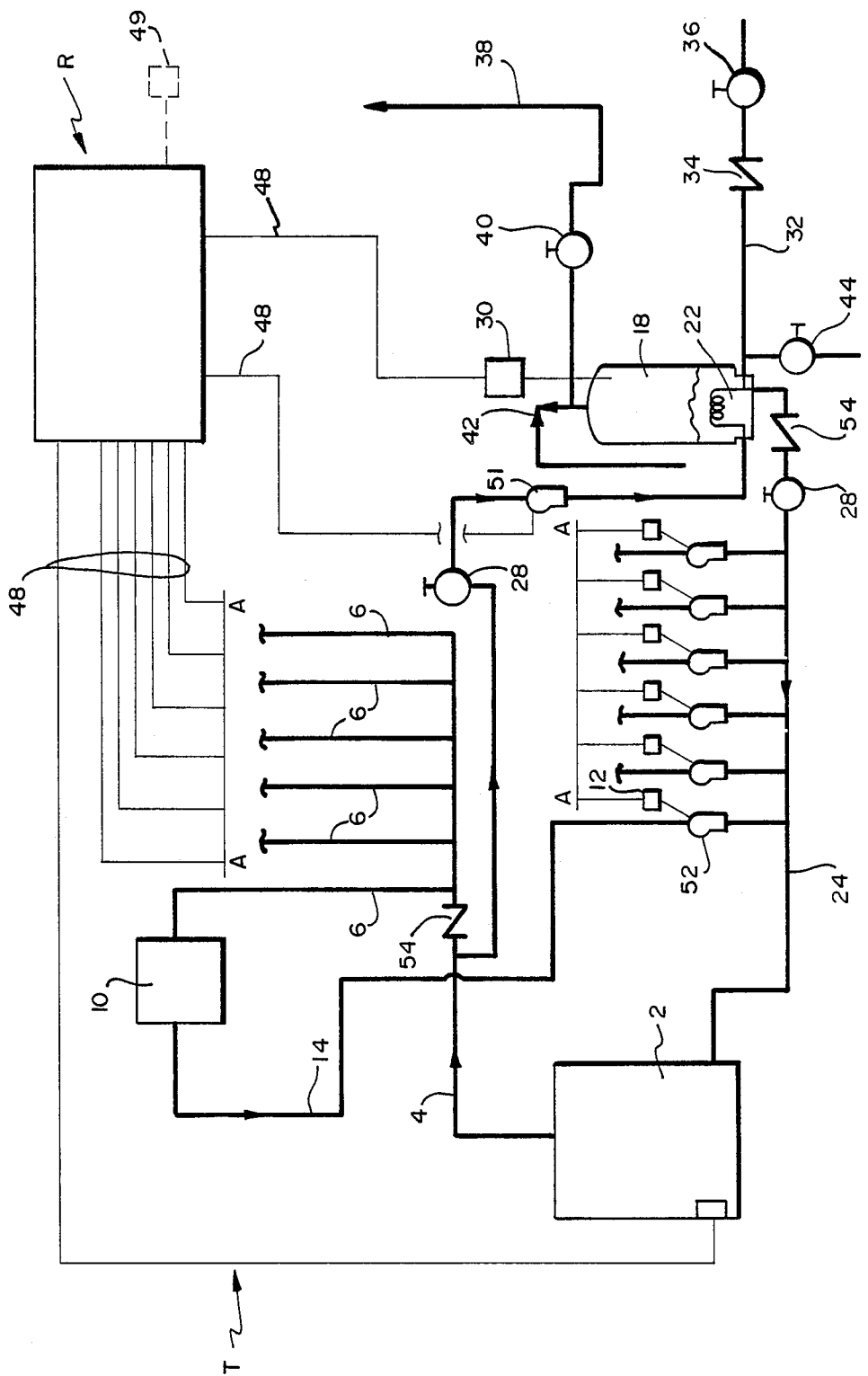
FIG. 2 is a schematic diagram of another hydronic heating system, with portions shown broken away, using a control device according to the present invention.

Another hydronic heating system T is shown in FIG. 2 in which the control device R is used. The hydronic heating system T is similar to the hydronic heating system S, except that return pumps 52 are used instead of the zone valves 8 for controlling the radiators 10 in the various zones. Each of the thermostats 12 connected to each of the return pumps 52 monitors the room temperature and activates or deactivates the respective return pump 52, depending on the thermostat setting. Check valve 54 ensures that boiler water flows only in one direction, as generally indicated by the arrows.

As in the hydronic heating system S, the wires 48 operably connect the control device R to the boiler 2, thermostats 12, return line circulator pumps 52, water heater circulator pump 51, and water heater thermostat 30. When the water heater temperature goes down to the lower thermostat limit, the thermostat 30 activates the control device R to shut down each of the return line circulator pumps 52, turn on the water heater circulator pump 51 and turn on the boiler 2. This causes at least a substantial portion of the output of the boiler 2 to be diverted to the water heater 18 through the heat exchanger 22, thereby permitting the water heater temperature to rise to the higher thermostat limit. When the water heater temperature reaches the upper thermostat limit, the control device R releases control of the system T, thereby permitting the thermostats 12 to control their respective pumps 52.

The systems S and T have been described as being typical residential installations. However, a person skilled in the art will understand that the systems may also be found in other types of buildings, such as an apartment building, small building, condominium, etc., where use of the device R will be equally advantageous.

FIGS. 3 AND 4

The control device R includes a housing 56 and a plurality of terminal strips 58 which are used for connecting the device R to the hydronic heating systems depicted in FIGS. 1 and 2. The housing 56 includes mounting holes 60 for conveniently mounting the control device R to a support structure within the house. An indicator light 62 provides visual indication when the control device R is activated by the water heater thermostat 30.

Figure 4:
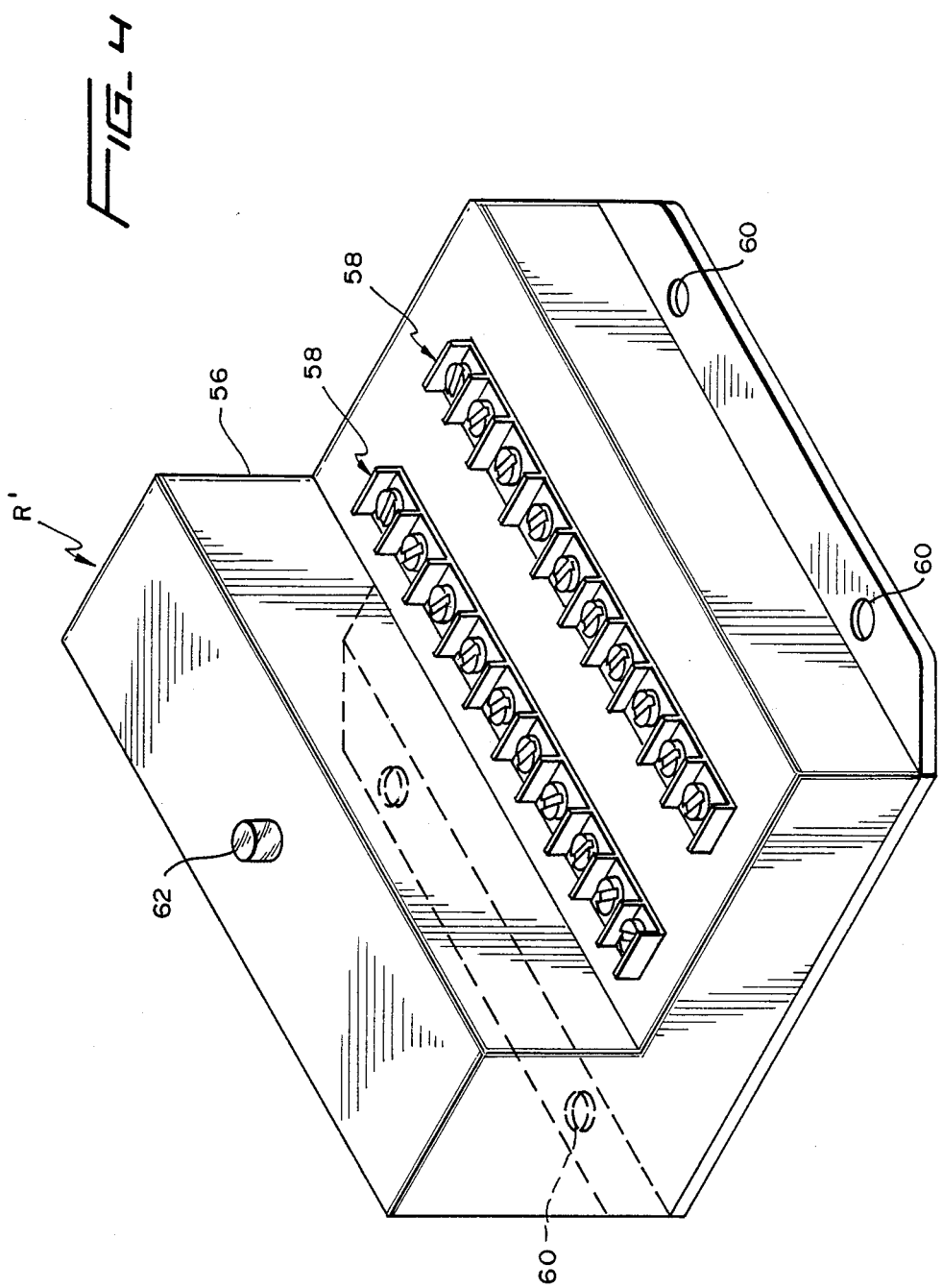
FIG. 4 is a front perspective view of another embodiment of the control device shown in FIG. 3.

Another embodiment of the control device R is disclosed in FIG. 4, and is generally designated as R'. The same numeral designations have been used for similar parts.

FIG. 5

Figure 5:
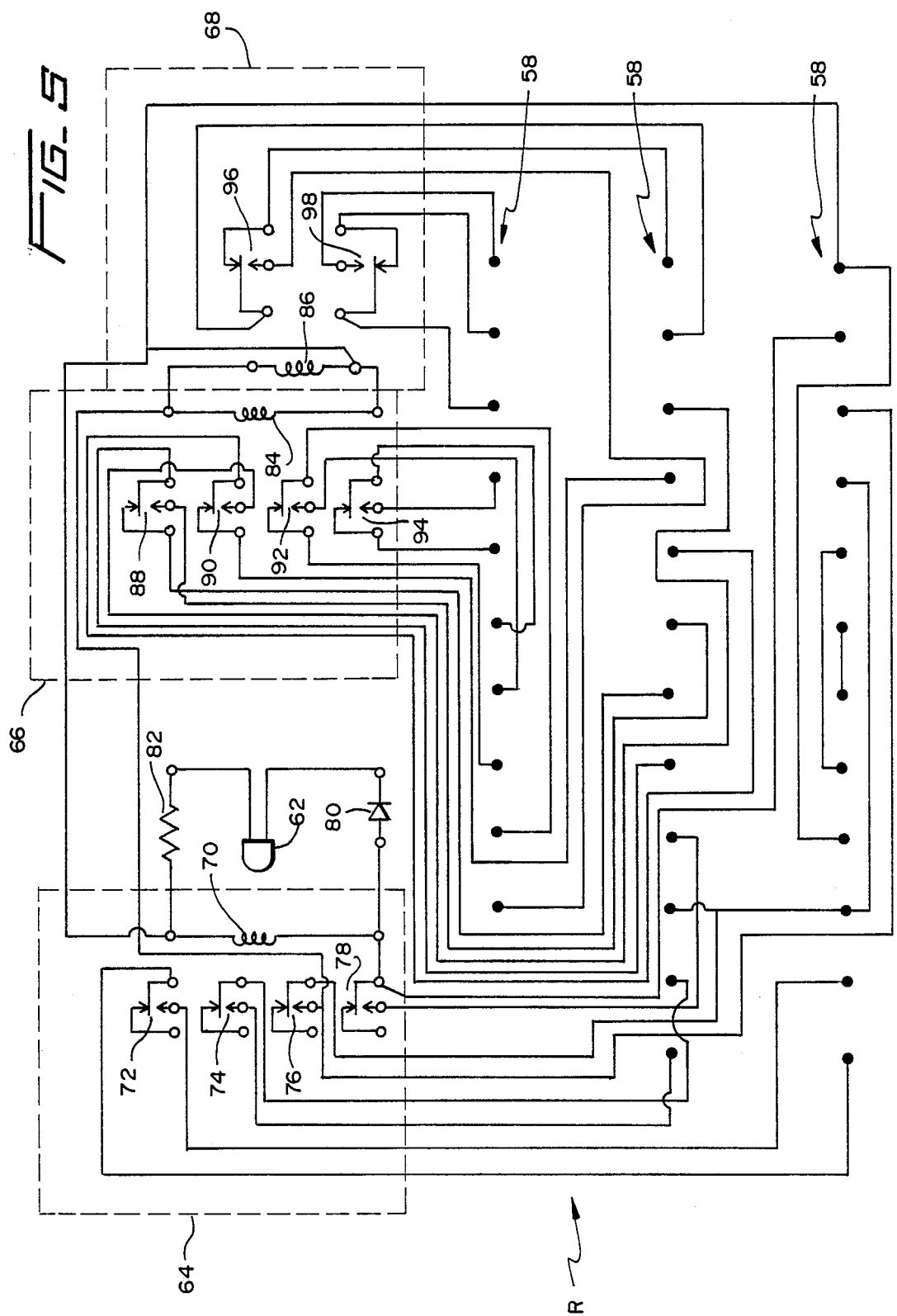
FIG. 5 is a schematic wiring diagram of the control device shown in FIG. 3.

A schematic diagram of the control device R is disclosed in FIG. 5. The control device R includes a four-pole-double-throw (4PDT) relay 64 which drives another four-pole-double-throw (4PDT) relay 66 and a two-pole-double-throw (2PDT) relay 68. The relay 64 is activated by the water heater thermostat 30 during a drawdown. The relay 64 includes a coil 70 which controls contacts 72, 74, 76 and 78. The indicator light 62 is connected in parallel with the coil 70 such that when coil 70 is energized, the indicator light 62 will also be energized. Diode 80 and resistor 82 are connected in series with the indicator light 62.

The contact 78 controls the operation of the water heater valve 26, as best shown in FIG. 1. The contact 76 energizes the relays 66 and 68 by energizing their respective coils 84 and 86. The contact 74 controls the operation of the boiler 2. The contact 72 controls the operation of the return line circulator pump 16 and the water heater circulator pump 46, through the auxiliary relay 50, as best shown in FIG. 1. The contact 72 also controls the water heater circulator pump 51 in the hydronic heating system T, as best shown in FIG. 2.

Figure 3:
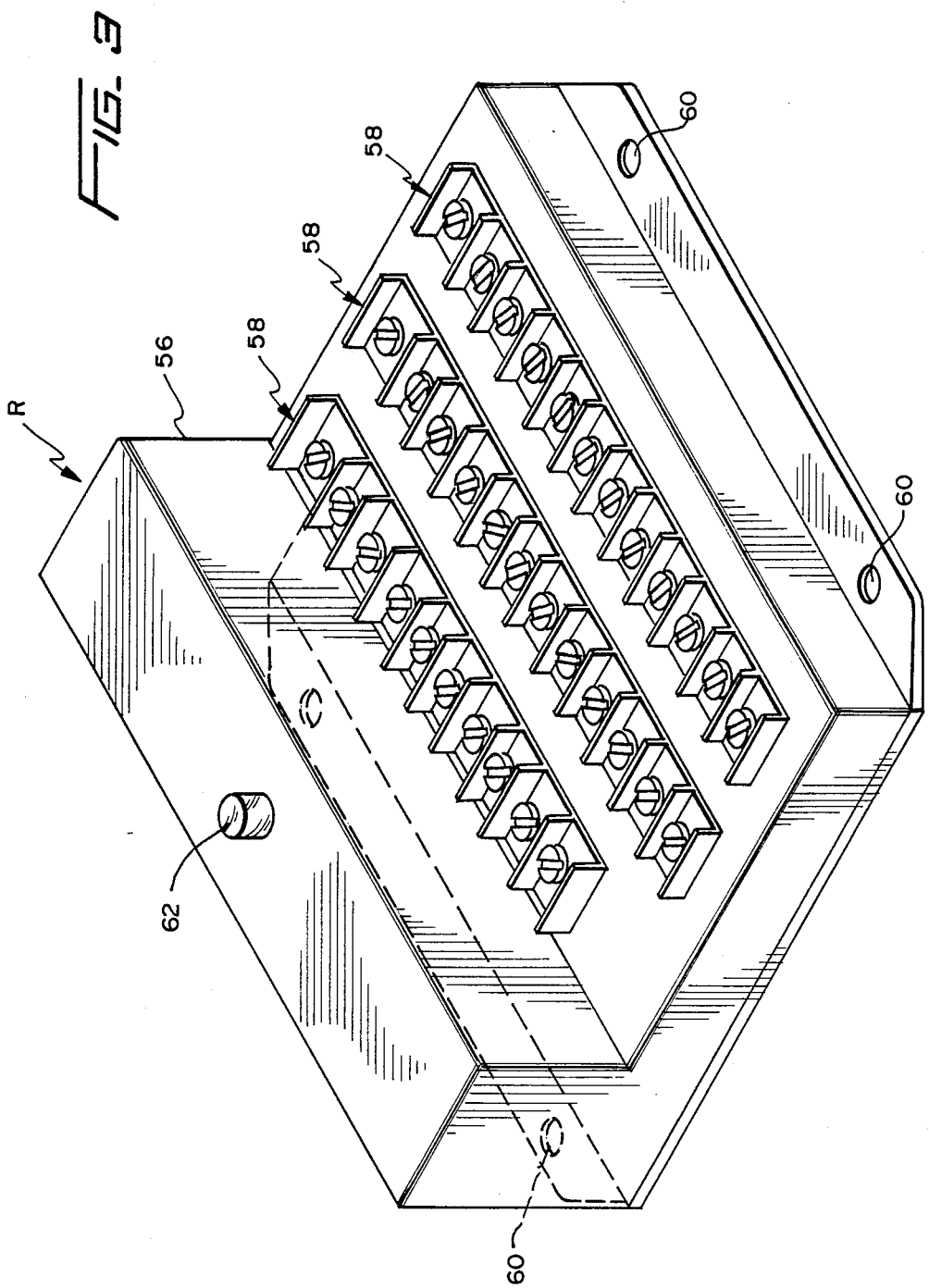
FIG. 3 is a front perspective view of a control device according to the present invention.

The relays 66 and 68 controls the operation of the space heating zone valves 8 and the return line pumps 52, as best shown in FIGS. 1 and 2. The coil 84 operates contacts 88, 90, 92 and 94. The coil 86 operates contacts 96 and 98. The terminal strips 58 shown in FIG. 3 are indicated as black dots in FIG. 5.

Depending on the specific application, all or a lesser number of the contacts 88, 90, 92, 94, 96 and 98 may be used. The device can handle up to six zone valves. In an application where there are six zone valves 8 which are similar to WHITE/ROGERS three-wire zone valves, all the contacts 88-98 are used. On the other hand, where there are less than six zone valves 8, or a different type of zone valve is used, such as a WHITE/ROGERS two-wire zone valve, a motor-operated zone valve with end switches or a TACO zone valve, two of the contacts 88-98 may be sufficient.

The device R is functionally divided between the water heater 18 and the zone valves 8 or the circulator pumps 52. This advantageously isolates any failure in the device R. Failure of the relay 64 will not affect the operation of the zone valves 8. Likewise, failure of the relays 66 and 68 will not affect the operation of the water heater 18. However, the amount of boiler water flowing through the heat exchanger 22 will be less if the relays 66 and 68 fail, since the zone valves 8 or the circulator pumps 52 will not have been closed or shut down to divert the output of the boiler 2 to the water heater 18.

FIG. 6

Figure 6:
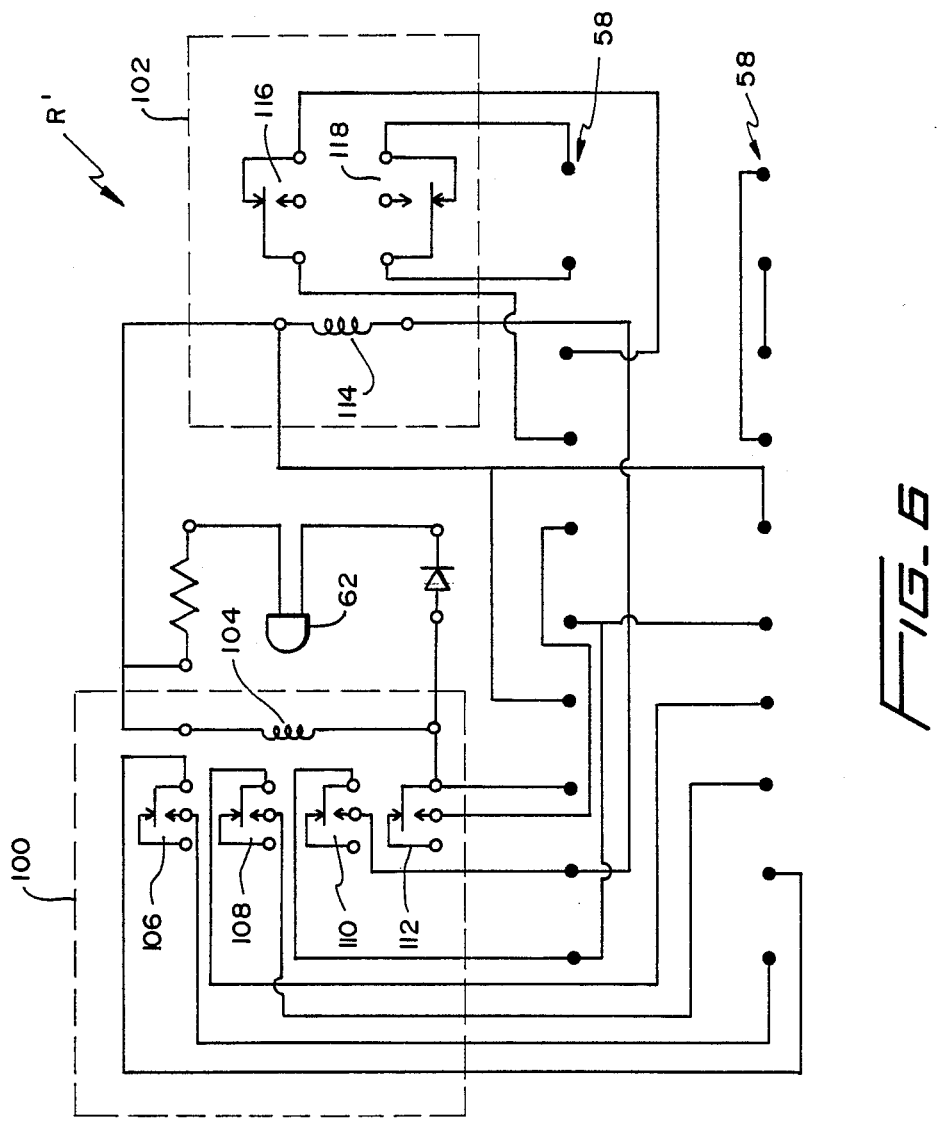
FIG. 6 is a schematic wiring diagram of the control device shown in FIG. 4.

The schematic diagram for control device R' is disclosed in FIG. 6. A four-pole-double-throw (4PDT) relay 100 drives a two-pole-double-throw (2PDT) relay 102. The relay 100 includes a coil 104 which activates contacts 106, 108, 110 and 112. The indicator light 62 is activated whenever the coil 104 is energized. When the water heater thermostat 30 closes during drawdown, the coil 104 is energized, thereby energizing the contacts 106, 108, 110 and 112. The contacts 110 energizes coil 114 of relay 102. The contacts 108 controls the boiler 2. The contacts 106 controls the water heater circulator pump 46 and the return line circulator pump 16 in the hydronic heating system S, as best shown in FIG. 1. In the hydronic heating system T, the contacts 106 controls the circulator pump 51, as best shown in FIG. 2.

The coil 114 of the relay 102 activates contacts 116 and 118 which in turn control the operation of the zone valves 8 or the circulator pumps 52, as best shown in FIGS. 1 and 2.

Depending on the specific application, one or both of the contacts 116 and 118 may be used. For example, in an application where there are six zone valves 8 which are similar to WHITE/ROGERS two-wire zone valves, contacts 116 and 118 are used. On the other hand, in an installation involving six typical two-wire zone valves 8 with end switches, only one of the contacts 116 and 118 is used.

The device R' is also functionally divided between the water heater 18 and the zone valves 8 or the circulator pumps 52. The relay 100 controls the flow of boiler water to the heat exchanger 22, while the relay 102 controls the flow of boiler water through the radiators 10. In this manner, failure of the relay 100 will not affect the flow of boiler water to the radiators 10. Likewise, failure in the relay 102 will not affect the flow of boiler water to the heat exchanger 22, except that the amount of boiler water available to the heat exchanger 22 will be less, since the space heating load of boiler 2 will not have been shut down.

FIGS. 7 AND 8

Figure 7:
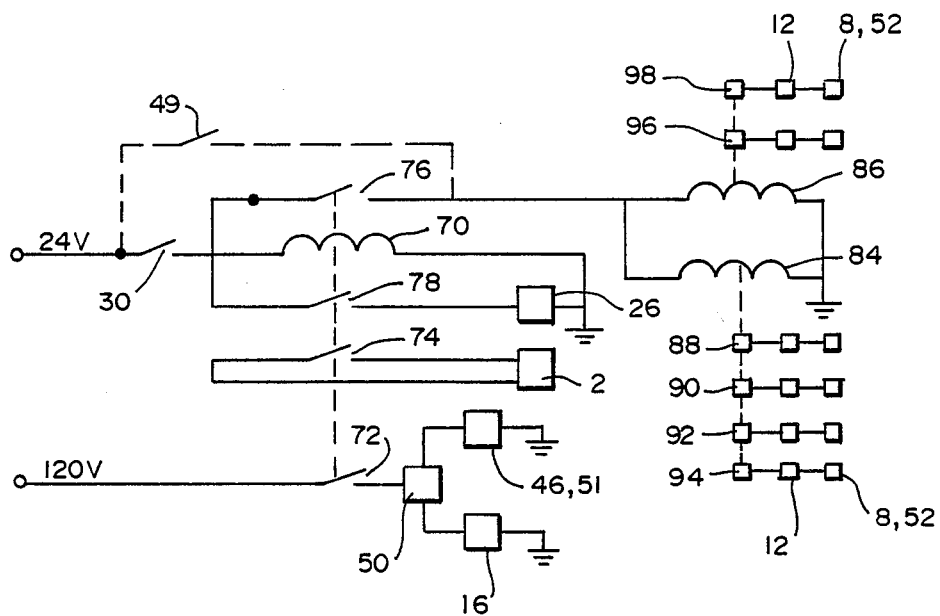
FIG. 7 is a simplified one-line diagram of the control device of FIG. 3, showing the connection of the device to the hydronic heating system of FIGS. 1 and 2.
Figure 8:
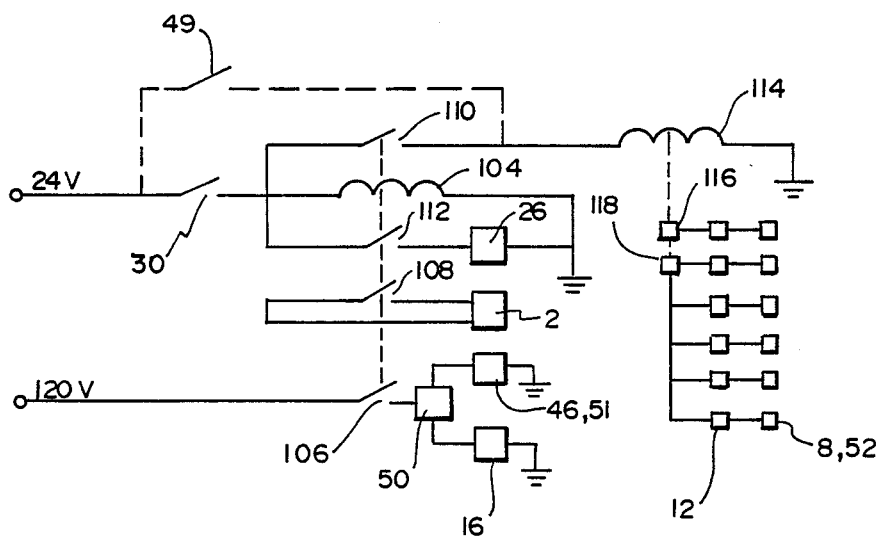
FIG. 8 is a simplified one-line diagram of the control device of FIG. 4, showing the connection of the device to the hydronic heating system of FIGS. 1 and 2.

Simplified schematic diagrams of the control devices R and R' as connected to the hydronic heating systems S and T, disclosed in FIGS. 1 and 2, are shown in FIGS. 7 and 8, respectively. The control devices R and R' can handle up to six zone valves 6 or six circulator pumps 52.

OPERATION

The water heater thermostat 30 triggers the operation of the control device R when the thermostat setting reaches the lower temperature limit. During drawdown of the water heater 18 through the supply line 38, the temperature of the water in the water heater 18 decreases, since make-up cold water is drawn through the cold water line 32 to replenish the amount of water being drawn out. When the water temperature reaches the lower thermostat limit, the thermostat 30 will close, triggering the activation of the control device R, as best shown in FIGS. 7 and 8.

Closure of the water heater thermostat 30 energizes the coil 70 in the relay 64. The coil 70 in turn closes the contacts 72, 74, 76 and 78. The contact 76 when closed energizes the coils 84 and 86 in the relays 66 and 68, respectively. The contact 78 when closed causes the valve 26 to open, thereby permitting high temperature water from the boiler 2 to flow through the heat exchanger 22. The contact 74 when closed turns on the boiler 2, since the contact 74 is connected across the external thermostat terminals of the boiler 2.

The coils 84 and 86 when energized trigger the contacts 88, 90, 92 and 94 in the relay 66 and contacts 98 and 96 in the relay 68. These contacts which are connected to the space heating thermostats 12 and the zone valves 8 cause the zone valves 8 to close, thereby diverting at least a substantial portion of the high temperature water generated by the boiler 2 to the heat exchanger 22 of the water heater 18.

In the alternative installation where the circulator pump 46 is used in lieu of the valve 26, the control device R is connected to the circulator pump 46 and the return line circulator pump 16 through the auxiliary relay 50. The contact 72 when energized causes the water heater circulator pump 46 to run and the return line circulator pump 16 to stop. At the same time, the contacts 88-98 cause the zone valves 8 to close.

When the water heater 18 reaches the upper thermostat limit, the water heater thermostat 30 opens, thereby deactivating the coil 70, causing the contacts 72, 74, 76 and 78 to open. The opening of the contact 76 de-energizes the coils 84 and 86. The opening of the contact 74 permits the boiler 2 to be controlled by the space heating thermostats 12. The opening of the contact 78 closes the valve 26. The opening of the contact 72 turns off the circulator pump 46 and turns on the return line circulator pump 16. Thus, when the thermostat 30 opens, the hydronic heating systems S and T operate normally where the thermostats 12 control their respective the zone valves 8 or circulator pumps 52.

An outside temperature sensor 49 may be connected across the water heating thermostat 30 and the contact 76 to cause the zone valves 8 or the circulator pumps 52 to close or stop, respectively, when the outside air temperature reaches a preset limit. As can be seen from FIGS. 7 and 8, the outside air sensor will not interfere with the operation of the control device R.

The operation of the control device R' is similar to the control device R as described in the above. Closure of the thermostat 30 in response to the water heater drawdown energizes the coil 104, closes the contacts 106, 108, 110 and 112. Closure of the contact 110 energizes the coil 114 of the relay 102. The coil 114 operates the contacts 116 and 118.

Although the invention has been disclosed as controlling six zone valves 8 or six circulator pumps 52, a person skilled in the art will understand that a lesser number may be controlled, depending on the requirements of the water heater 18. Also, a person skilled in the art will understand that the device R may also be applicable to a hybrid heating system having a mixture of features of systems S and T.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:
1. An automatic control device for a hydronic heating system for space heating and water heating, said device comprising:
 (a) a first relay means for connecting to a water temperature switch operably associated with a water heater such that said first relay means is energized and deenergized when the switch is closed and opened, respectively;
 (b) said first relay means being connectable to an electrically operated valve controlling the flow of high temperature water from a boiler to a heat exchanger operably associated with the water heater such that the electrically operated valve is opened and closed when said first relay means is energized and de-energized, respectively;
 (c) said first relay means being connectable to the boiler such that the boiler is turned on when said first relay means is energized;
 (d) a second relay means for connecting to said first relay means such that said second relay means is energized and de-energized when said first relay means is energized and de-energized, respectively; and
 (e) said second relay means being connectable to a plurality of zone valves controlling the flow of high temperature water from the boiler to a plurality of space heaters such that the plurality of zone valves are closed when said second relay means is energized, thereby diverting at least a substantial portion of the output of the boiler to the water heater when the water temperature switch is closed.

2. A control device as in claim 1, wherein:
 (a) said first relay means includes first, second and third contacts.

3. A control device as in claim 2, wherein:
 (a) said first contact is operably associated with the electrically operated valve.

4. A control device as in claim 3, wherein:
 (a) said second contact is operably associated with said second relay means.

5. A control device as in claim 4, wherein:
 (a) said third contact is operably associated with the boiler.

6. A control device as in claim 1, wherein:
 (a) said second relay means includes a plurality of contacts each of which is connectable to each of the plurality of zone valves.

7. A control device as in claim 1, and further comprising:
 (a) a third relay means connected in parallel with said second relay means.

8. A control device as in claim 7, wherein:
 (a) said third relay means is connectable to another plurality of space heating valve means controlling the flow of high temperature water from the boiler to another plurality of space heaters.

9. A control device as in claim 1, and further comprising:
 (a) means for connecting an outside air temperature switch in parallel with the water heater temperature switch and said first relay means such that said second relay means is energized when the outside air temperature switch is closed to thereby turn off the plurality of zone valves.

10. A control device as in claim 1, and further comprising:
   (a) a housing for said first and second relay means; and
   (b) a plurality of terminal connectors, operably connected to said first and second relay means, disposed on said housing.

11. A control device as in claim 10, and further comprising:
   (a) means for indicating when said first relay means is energized.

12. An automatic control device for a hydronic heating system for space heating and water heating, said device comprising:
   (a) switch means for connecting to a water temperature sensor operably associated with a water heater such that said switch means is energized when the sensor detects a lower preset temperature and is de-energized when the sensor detects an upper preset temperature;
   (b) first means for connecting said switch means to a water heater valve means for controlling the flow of high temperature water from a boiler to a heat exchanger operably associated with the water heater such that the valve means is opened and closed when said switch means is energized and de-energized, respectively;
   (c) second means for connecting said switch means to the boiler such that the boiler is turned on when said switch means is energized;
   (d) third means for connecting said switch means to a plurality of space heating valve means for controlling the flow of high temperature water from the boiler to a plurality of space heaters such that the plurality of valve means are closed when said switch means is energized, thereby diverting at least a substantial portion of the output of the boiler to the water heater when the sensor detects the lower preset temperature;
   (e) said switch means including first and second relays; and
   (f) said first relay being operably connected to said second relay such that said second relay is energized when said first relay is energized.

13. A control device as in claim 12, wherein:
   (a) said switch means includes a relay having a plurality of contacts.

14. A control device as in claim 13, wherein:
   (a) each of said plurality of contacts is operably connected to the water heater valve means, boiler and plurality of space heating valve means.

15. A control device as in claim 12, wherein:
   (a) said first relay is operably connected to the temperature sensor such that said first relay is energized when the temperature sensor detects the lower preset temperature and is de-energized when the sensor detects the upper preset temperature.

16. A control device as in claim 15, wherein:
   (a) said first relay is operably connected to the water heater valve means and the boiler such that the water heater valve means is opened and the boiler is turned on when said first relay is energized and the water heater valve means is closed when said first relay is de-energized.

17. A control device as in claim 12, wherein:
   (a) said second relay is operably connected to the plurality of space heating valve means such that the plurality of space heating valve means are closed and opened when said second relay is energized and de-energized, respectively.

18. A control device as in claim 17, and further comprising:
   (a) means for connecting an outside air temperature sensor in parallel with the water heater temperature sensor and said second relay such that said second relay is energized when the outside air temperature sensor detects a preset outside temperature to thereby turn off the plurality of space heating valve means.

* * * * *